United States Patent
Hauptmann et al.

(10) Patent No.: US 12,454,015 B2
(45) Date of Patent: Oct. 28, 2025

(54) SEALING LIP ON TOOL FITTING

(71) Applicant: Hilti Aktiengesellschaft, Schaan (LI)

(72) Inventors: Udo Hauptmann, Landsberg (DE); Ulrich Mandel, Buchloe Honsolgen (DE)

(73) Assignee: Hilti Aktiengesellschaft, Schaan (LI)

( * ) Notice: Subject to any disclaimer, the term of this patent is extended or adjusted under 35 U.S.C. 154(b) by 560 days.

(21) Appl. No.: 17/619,775

(22) PCT Filed: Jun. 30, 2020

(86) PCT No.: PCT/EP2020/068375
§ 371 (c)(1),
(2) Date: Dec. 16, 2021

(87) PCT Pub. No.: WO2021/004834
PCT Pub. Date: Jan. 14, 2021

(65) Prior Publication Data
US 2022/0355389 A1 Nov. 10, 2022

(30) Foreign Application Priority Data

Jul. 11, 2019 (EP) .................................. 19185763

(51) Int. Cl.
*B23B 31/00* (2006.01)
*B25D 17/08* (2006.01)

(52) U.S. Cl.
CPC .......... *B23B 31/001* (2013.01); *B25D 17/088* (2013.01); *B23B 2231/28* (2013.01);
(Continued)

(58) Field of Classification Search
CPC . B23B 31/001; B23B 2231/28; B25D 17/088; B25D 2217/0069; B25D 2250/365; Y10T 279/3496; Y10T 279/17076
See application file for complete search history.

(56) References Cited

U.S. PATENT DOCUMENTS 5,470,084 A * 11/1995 Reibetanz ........... B23B 31/1238
279/62
2002/0050365 A1 5/2002 Bongers-Ambrosius et al.
(Continued)

FOREIGN PATENT DOCUMENTS

CN 1332064 A 1/2002
CN 104220795 A 12/2014
(Continued)

OTHER PUBLICATIONS

Machine Translation of EP-0548702-A1 (Year: 1993).*
International Search Report of PCT/EP2020/068375, dated Sep. 30, 2020.

*Primary Examiner* — Sunil K Singh
*Assistant Examiner* — Eric Daniel Whitmire
(74) *Attorney, Agent, or Firm* — Davidson Kappel LLC

(57) ABSTRACT

Tool fitting device for a power tool, in particular a chipping hammer, including—a holding device for receiving and holding a tool shank, a retention element extending at least around a section or sections of the holding device, and a dust protection device for preventing the penetration of dust into the tool fitting device. The dust protection device includes at least one first dust stripping element, at least one fixing bead, and at least one sealing lip element, wherein the sealing lip element is positioned in front of the retention element in the axial direction. Dust protection device for use in a tool fitting device.

16 Claims, 5 Drawing Sheets

(52) U.S. Cl.
CPC ............... *B25D 2217/0069* (2013.01); *B25D 2250/365* (2013.01); *Y10T 279/17076* (2015.01); *Y10T 279/3493* (2015.01)

(56) References Cited

U.S. PATENT DOCUMENTS

| | | | |
|---|---|---|---|
| 2003/0000715 A1 | 1/2003 | Ullrich et al. | |
| 2003/0047888 A1* | 3/2003 | Hahn | B25D 17/088 279/19.1 |
| 2003/0089509 A1* | 5/2003 | Wanek | B25D 17/088 173/48 |
| 2005/0146097 A1* | 7/2005 | Hellbach | B25D 17/088 173/132 |
| 2010/0176561 A1* | 7/2010 | Braun | B25D 17/088 279/82 |
| 2014/0353915 A1 | 12/2014 | Jordan et al. | |
| 2017/0057073 A1 | 3/2017 | Meixner et al. | |

FOREIGN PATENT DOCUMENTS

| | | | | |
|---|---|---|---|---|
| DE | 2750219 A1 | 5/1979 | | |
| DE | 3638215 A1 | 5/1988 | | |
| DE | 102012223099 A1 | 6/2014 | | |
| EP | 548702 A1 * | 6/1993 | ........... | B23B 31/001 |
| EP | 1946894 A1 | 7/2008 | | |
| EP | 2910337 A1 | 8/2015 | | |
| EP | 3009237 A1 | 4/2016 | | |
| WO | WO 2014090786 A1 | 6/2014 | | |

* cited by examiner

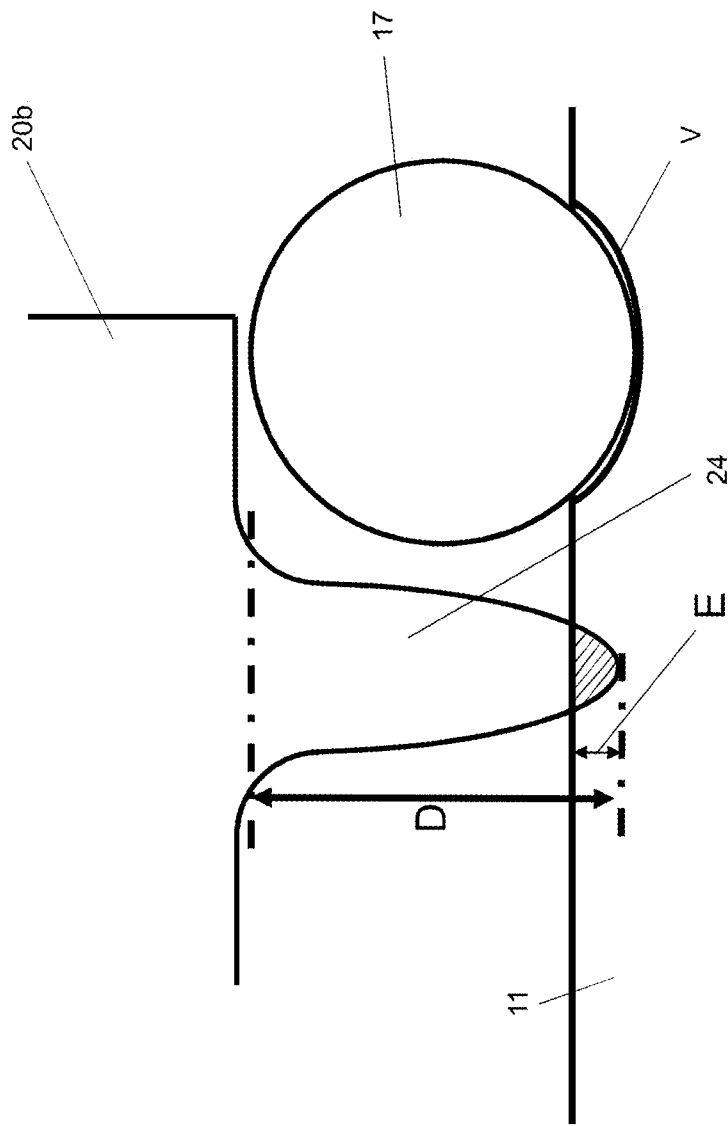
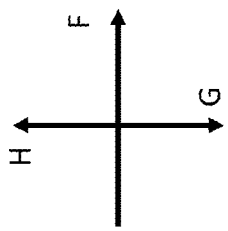
Fig. 5

SEALING LIP ON TOOL FITTING

The present invention relates to a tool fitting device for a power tool, in particular a chipping hammer, comprising a holding device for receiving and holding a tool shank, a retention element extending at least around a section or sections of the holding device, and a dust protection device for preventing the penetration of dust into the tool fitting device.

The present invention furthermore relates to a dust protection device for use in a tool fitting device.

SUMMARY OF THE INVENTION

When working with power tools and especially when working with a chipping hammer on mineral materials (e.g. concrete or stone), dust may be formed. Such dust can get into the interior of a power tool through small openings, such as a gap between mutually adjoining housing parts. The dust, particularly mineral dust, can have a not inconsiderable abrasive effect on moving parts on components of the power tool. Damage to individual components of the power tool or even failure of the entire power tool may result from abrasive wear. When working with power tools and especially when working with chipping hammers, vibration arises at the components and parts of the power tool. Owing to this unavoidable vibration, almost all the components of the power tool may move relative to one another. Penetrating dust which gets between vibrating components promotes and accelerates the wear of the components. Small components, e.g. retention elements, are particularly susceptible to vibration and to the abrasive effect of the penetrating dust.

The dust protection device and tool fitting device having a dust protection device of the type mentioned at the outset are known in principle from the prior art but often offer only inadequate protection, i.e. sealing features, against penetrating dust.

It is an object of the present invention to provide a tool fitting device and a dust protection device for use in a tool fitting device, by means of which the penetration of dust into the interior of a tool fitting device can be prevented more effectively.

The present invention to provides a tool fitting device for a power tool, in particular a chipping hammer, comprising a holding device for receiving and holding a tool shank, a retention element extending at least around a section or sections of the holding device, and a dust protection device for preventing the penetration of dust into the tool fitting device.

According to the invention, the dust protection device comprises at least one first dust stripping element, at least one fixing bead, and at least one sealing lip element, wherein the sealing lip element is positioned in front of the retention element in the axial direction.

It is thereby possible in a simple manner to prevent penetration of dust and dirt into the interior of the tool fitting device.

The retention element can be configured as a snap ring or the like.

According to an advantageous embodiment of the present invention, it may be possible for a second dust stripping element to be included, wherein the first and the second dust stripping element are arranged at a distance from one another along an axial longitudinal axis. By means of the second dust stripping element, which is spaced apart from the first dust stripping element, it is possible to ensure that, if vibration acts on the tool fitting device, there is always at least one dust stripping element resting against the tool shank and therefore counteracting the penetration of dust into the interior of the tool fitting device.

According to another advantageous embodiment of the present invention, provision can be made for the dust protection device and the holding device to be arranged relative to one another in such a way that a distance along an axial longitudinal axis is provided between one end of the at least one dust stripping element and one end of the holding device. It is thereby possible in a simple manner to ensure that collisions between the holding device and the dust stripping element can be prevented in the event of vibration acting on the tool fitting device and of movement of the dust stripping element. It is important to prevent collisions or contact between the holding device and the dust stripping element in order to prevent the possibility of the dust stripping element becoming caught on the holding device and the dust stripping element no longer resting against the tool shank in an effective manner for sealing against penetrating dust.

According to another advantageous embodiment of the present invention, it may be possible for the sealing lip element to comprise a cross-sectional area that tapers in the radial direction. This ensures high deformability and flexibility of the sealing lip element and secures contact with the holding device for the purpose of sealing against penetrating dust.

According to another advantageous embodiment of the present invention, provision may be made for the sealing lip element to comprise a concave side face directed toward the retention element. The concave shape is ideally suited to large-area contact or sealing of the sealing lip element with/against a subregion of the surface of the retention element. This is particularly the case if the retention element is in the form of a snap ring with a circular cross-sectional area.

According to another advantageous embodiment of the present invention, it may be possible for the fixing bead to comprise a substantially trapezoidal cross-sectional area. This is a simple means of enabling the dust protection device to be pushed relatively easily onto the holding device in the axial direction and secured against unintentional removal from the holding device.

Moreover, the present invention provides a dust protection device for use in a tool fitting device in accordance with at least one of the abovementioned embodiments.

Further advantages can be found in the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWINGS

In the figures, components which are the same and components of the same type are denoted by the same reference signs. In the figures:

FIG. 5 shows a sectional illustration with further details of the sealing lip element and of the retention element.

DETAILED DESCRIPTION

Figure 1:
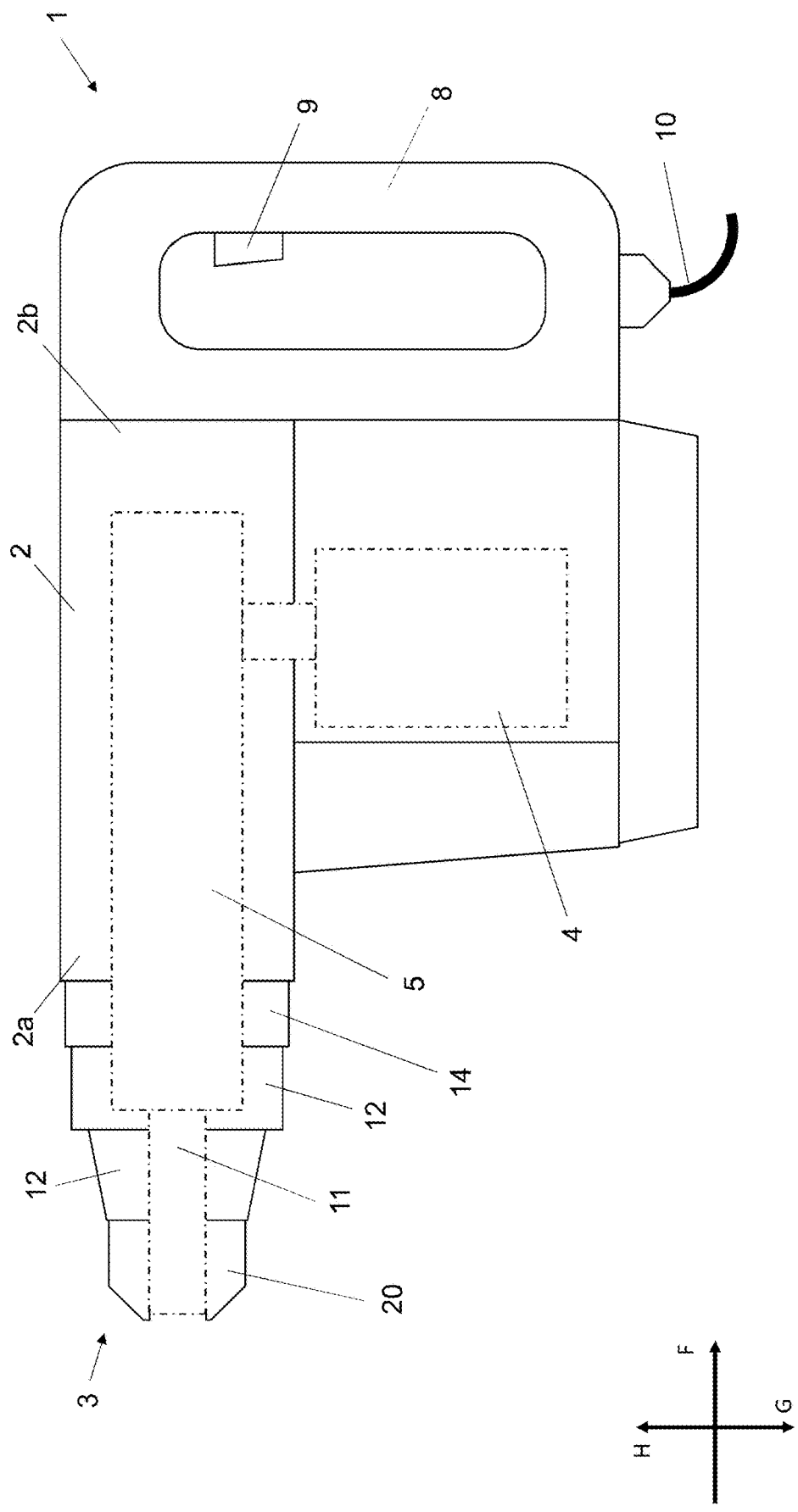
FIG. 1 shows a schematically illustrated power tool in the form of a chipping hammer having a tool fitting device according to the invention and a dust protection device according to the invention.

FIG. 1 illustrates a power tool 1 in the form of a chipping hammer. Alternatively, the power tool 1 can also be in the form of a hammer drill, a power drill or a combination hammer. A combination hammer is a combination of a hammer drill and a chipping hammer. Moreover, the power tool 1 may also be a saw, in particular a reciprocating saw.

The power tool 1 illustrated in FIG. 1 essentially comprises a housing 2, a tool fitting device 3, a drive 4, an impact mechanism 5 and a holding device 11. The drive 4, the impact mechanism 5 and the holding device 11 are positioned in the interior of the housing 2 of the power tool 1. The drive 4 is in the form of an electric motor and is connected to the impact mechanism 5 and the holding device 11 in the interior of the housing 2 in such a way that an impulse produced by the drive 4 and the impact mechanism 5 is transmitted to a tool 7 situated in the holding device 11.

The housing 2 has a front end 2a and a rear end 2b. A handle 8 having an activation switch 9 is positioned on the rear end 2b of the housing 2. By means of the handle 8, the power tool 1 can be held and guided by a user. The activation switch 9 is used to operate or activate the power tool 1 and, in particular, the drive 4 and the impact mechanism 5. The user is not shown in the figures.

There is furthermore a mains cable connection 10 at the rear end 2b of the housing 2 of the power tool 1. The mains cable belonging to the mains cable connection 10 is shown only indicatively in FIG. 1. Via the mains cable connection 10, the power tool 1 can be supplied with electrical power from a network. Alternatively, the power tool 1 can also be supplied with electrical power by a rechargeable battery connected to the power tool 1. The rechargeable battery is not shown in the figures.

Figure 2:
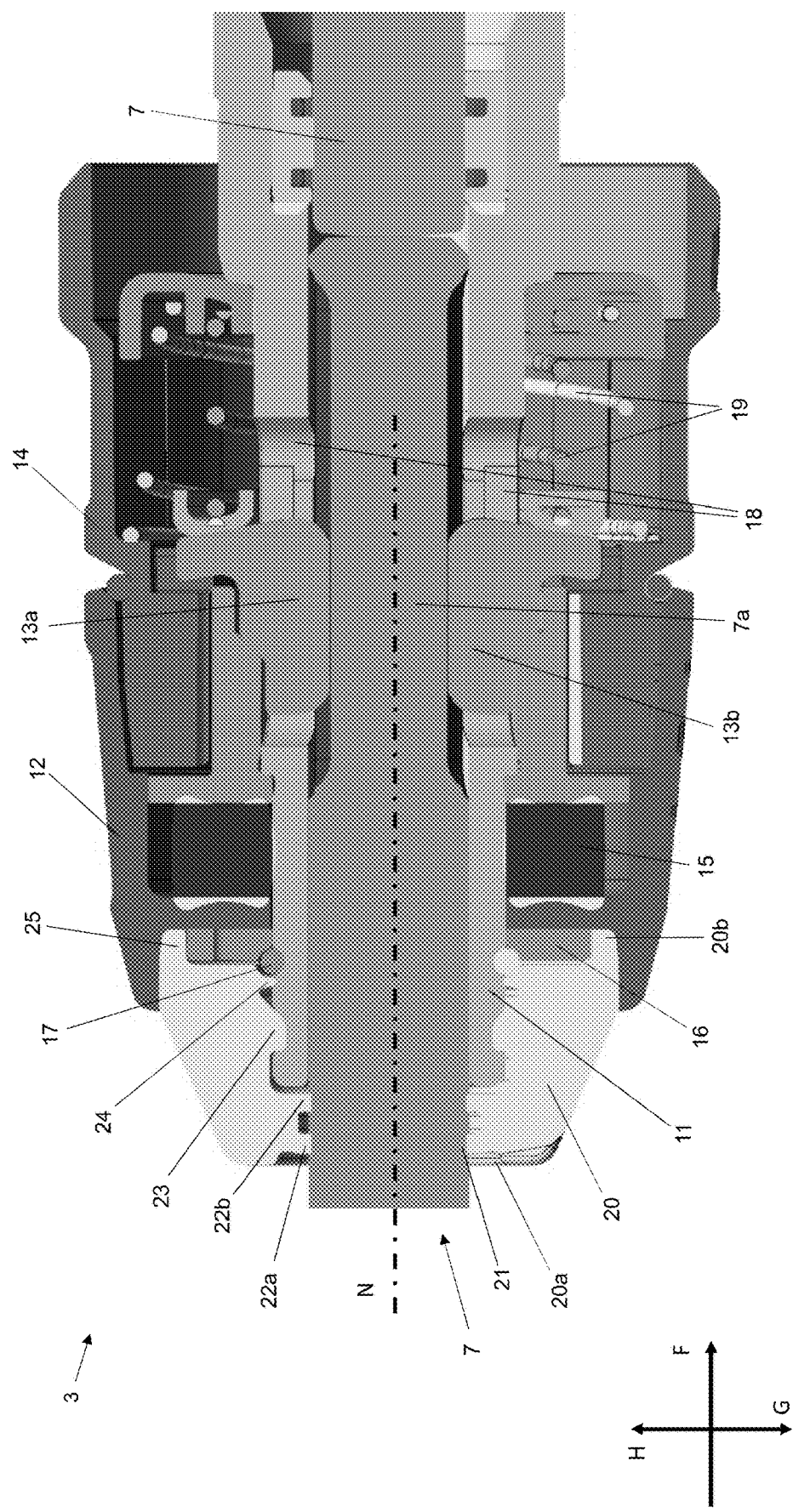
FIG. 2 shows a sectional illustration of the tool fitting device according to the invention having the dust protection device according to the invention, with a tool shank inserted into the tool fitting device.

The tool fitting device 3 is positioned at the front end 2a of the housing 2 of the power tool 1. The tool fitting device 3 serves to receive and hold a tool 7. In the present embodiment of the power tool 1 and of the tool fitting device 3, the tool 7 is in the form of a chisel. FIG. 2 shows a rear end of the tool 7 designed as a chisel. The rear end of the chisel 7a may be referred to as a shank, chisel shank or tool shank.

The tool fitting device essentially comprises a holding device 11, a tool cap 12, two locking pawls 13a, 13b, a release device 14, damping elements 15, a holding ring 16, a retention element 17 and a dust protection device 20.

As indicated in FIGS. 1 and 2, the holding device 11 is designed substantially as a cylindrical tube into which the tool shank 7a can be inserted. The holding device 11 designed as a cylindrical tube furthermore has openings 18, in which the locking pawls 13a, 13b are positioned. The locking pawls 13a, 13b may also be referred to as holding cheeks. The locking pawls 13a, 13b can be set in a holding position or a release position by the release device 14. By means of the locking pawls 13a, 13b, which project through the openings 18 in the holding device 11, the tool shank 7a can be secured in the holding device 11 against falling out axially when the locking pawls 13a, 13b are in the holding position (cf. FIG. 2). In this case, the locking pawls 13a, 13b do not rest against the tool shank 7a and do not jam the tool shank 7a in the holding device 11. In the holding position of the locking pawls 13a, 13b, the tool 7 can move axially in the holding device 11. As shown in FIG. 2, the locking pawls 13a, 13b almost rest against the tool shank 7a in the holding position.

As indicated in FIG. 2, the release device 14 is designed as a sleeve and is positioned around the locking pawls 13a, 13b. The release device 14 designed as a sleeve can be moved counter to the force of a spring 19 in direction F from a first position to a second position. In the first position, the release device 14 has the effect that the locking pawls 13a, 13b almost rest against the tool shank 7a situated in the holding device 11 and thus hold the tool 7 in the holding device 11. The spring 19 presses the release device 14 counter to direction F in the first position and thus presses the locking pawls 13a, 13b in the direction of the tool shank 7a. When the release device 14 is pressed in direction F, counter to the spring force of the spring 19, the release device 14 no longer exerts a force on the locking pawls 13a, 13b, with the result that the locking pawls 13a, 13b are radially movable. In other words: the locking pawls 13a, 13b can be moved from the holding position to the release position when the release device 14 is in the second position. In the release position, the tool shank 7a can be removed from the holding device 11 counter to direction F.

The tool cap 12 is likewise designed as a sleeve and positioned in front of the release device 14 in direction F. In this case, the tool cap 12 is provided as a holder and serves to hold the tool fitting device 3 when, for example, the release device 14 is moved in direction F. Moreover, the tool cap 12 also prevents dust or dirt from being able to penetrate into the interior of the tool fitting device 3.

As indicated in FIG. 2, the damping element 15 is of substantially annular design and is positioned under a preload between the tool cap 12 and the holding device 11. The damping element 15 is composed of a flexible material, e.g. an elastomer, and serves inter alia to damp vibration in the tool fitting device 3. Since the damping element 15 is positioned under a preload between the tool cap 12 and the holding device 11, the damping element 15 furthermore exerts a force or a pressure in the axial direction on adjacent parts. As a result, there is a stress or a pressure in the tool fitting device 3, with the result that the individual components or parts of the tool fitting device 3 are pressed against one another. As described below, the damping element 15 interacts with the retention element 17 in order to introduce a preload into the tool fitting device 3.

The damping element 15 furthermore serves to damp force peaks or pulses in the event of an idle strike during the use of the power tool 1 designed as a chipping hammer. An idle strike takes place if the tool (in the form of a chisel) does not strike a material (e.g. concrete) but strikes the air. In this case, the impact energy is undesirably transmitted to the housing 2 of the power tool 1 and ultimately also to the user of the power tool 1.

Figure 4:
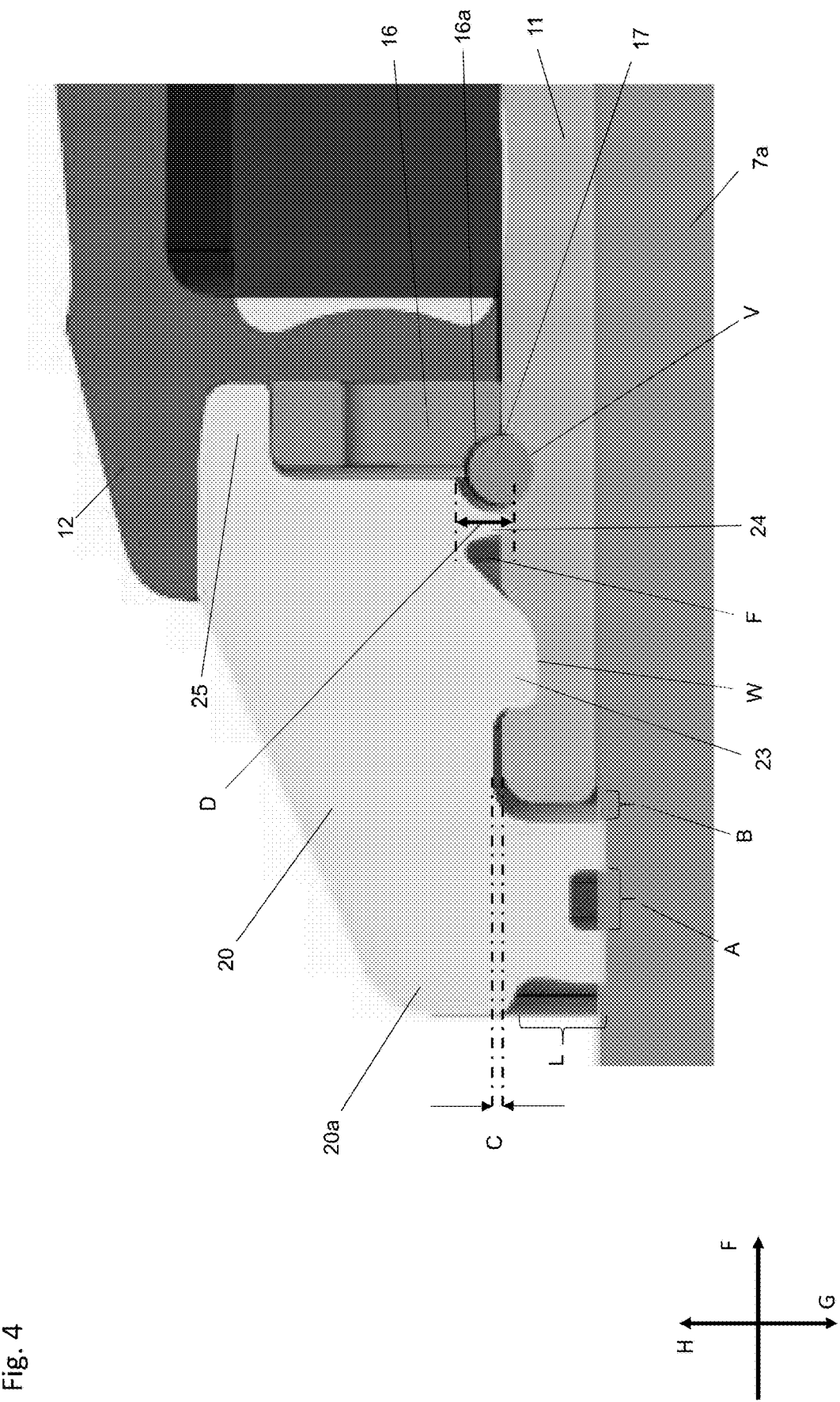
FIG. 4 shows a sectional illustration with further details of an upper component of the dust protection device according to the invention.

Moreover, as shown in FIG. 2, the holding ring 16 is positioned in front of the tool cap 12 in direction F and around the holding device 11. The holding ring 16 is of substantially annular design and, in interaction with the retention element 17, serves to fix the tool cap 12 on the holding device 11. As shown in FIG. 4, the holding ring 16 has a sector-shaped recess 16a, thereby giving rise to a concave outer surface. In this case, the shape and position of this recess 16a are chosen so that the retention element 17 fits on or into the holding ring 16.

As shown in FIG. 2, the retention element 17 is designed as a snap ring and is positioned in front of the holding ring 16 in direction F. The retention element 17 designed as a snap ring serves to hold or fix the holding ring 16 and the tool cap 12 on the holding device 11. The holding device 11 has a corresponding depression V in the form of a groove at the height or location of the snap ring 17. The snap ring 17 rests in the groove V.

The dust protection device 20 serves to prevent the penetration of dust into the tool fitting device 3 and is designed substantially as a frustoconical cap with a central through hole 21. Here, the dust protection device 20 is composed of a flexible material, which may also be referred to as an elastomer. Moreover, the dust protection device 20 essentially comprises a front end 20a, a rear end 20b, a first dust stripping element 22a, a second dust stripping element 22b, a fixing bead 23 and a sealing lip element 24.

Figure 3:
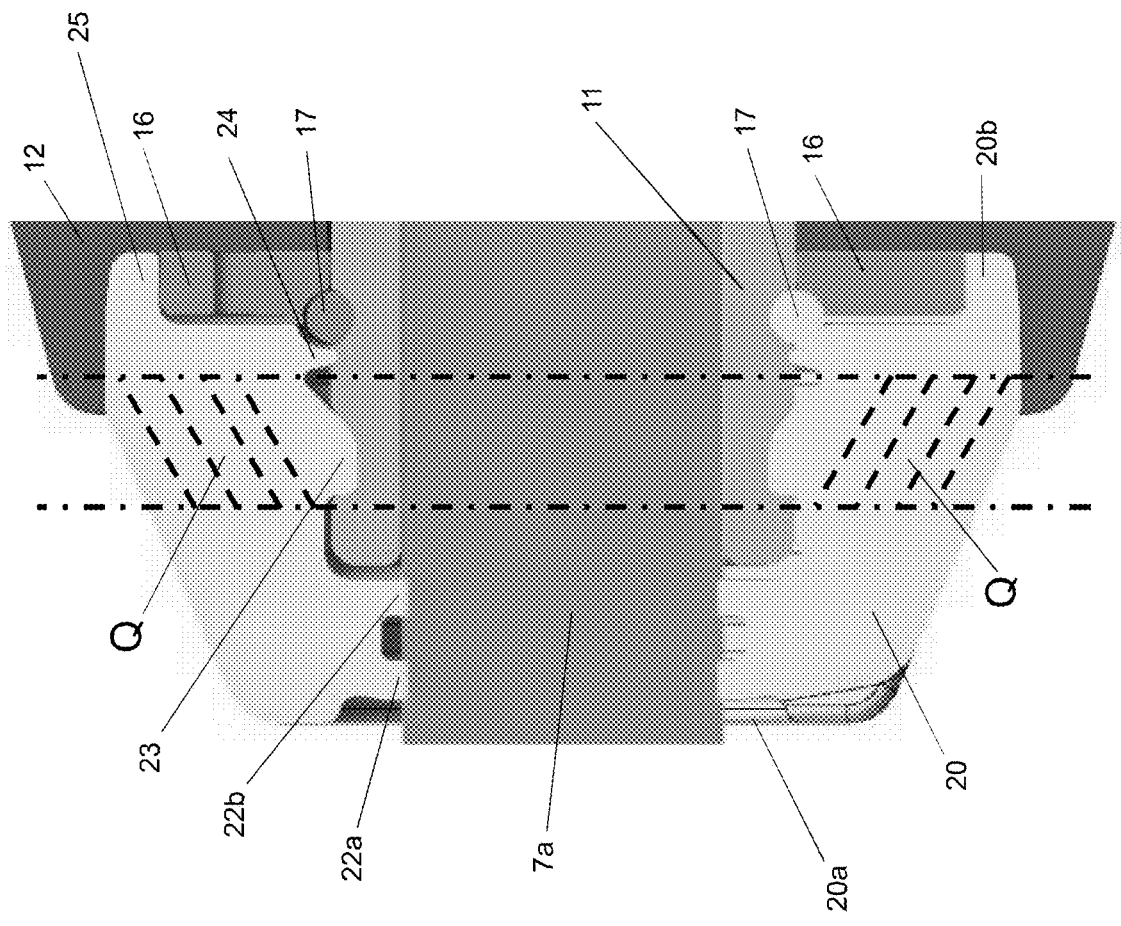
FIG. 3 shows a sectional illustration with details of the dust protection device according to the invention.

As shown especially in FIGS. 3 and 4, the first dust stripping element 22a is positioned substantially at the front end 20a. Both the first and the second dust stripping element 22a, 22b extend in the radial direction. Here, the length L of the first and the second dust stripping element 22a, 22b is chosen so that the first and the second dust stripping element 22a, 22b rest against the surface of a tool shank 7a when a tool 7 is inserted into the holding device 11. The first and the second dust stripping element 22a, 22b are arranged at a distance A from one another along the axial longitudinal axis N. Here, the distance A corresponds substantially to half the length L. The distance A between the first and the second dust stripping element 22a, 22b serves to ensure that, in the event of vibration acting on the dust protection device 20, there is always at least one dust stripping element 22a, 22b resting against the tool shank 7a and thus sealing it off from penetrating dust. The dust stripping elements 22a, 22b act on the tool shank 7a and serve in general to prevent the penetration of dust into the interior of the tool fitting device 3.

The dust protection device 20 and the holding device 11 are arranged relative to one another in such a way that a distance B along the axial longitudinal axis N is provided between an outer end of the second dust stripping element 22b and one end of the holding device. Here, the distance B corresponds substantially to half the distance A. (See, e.g., FIG. 4). The distance B serves to ensure that the second dust stripping element 22b can move relatively freely and does not strike the end of the holding device 11 when vibration acts on the tool fitting device 3 and the second dust stripping element 22b. In addition to the first and the second dust stripping element 22a, 22b, a further dust stripping element or a plurality of dust stripping elements can also be provided. Moreover, the dust protection device 20 and the holding device 11 are arranged relative to one another in such a way that a distance C is formed between an inner lateral surface of the dust protection device 20 and the surface of the holding device 11.

The fixing bead 23 is positioned between the dust stripping elements 22a, 22b and the sealing lip element 24 and extends in the radial direction. The fixing bead 23 comprises a substantially trapezoidal cross-sectional area with at least one obliquely rising end face. Here, the obliquely rising end face faces in direction F toward the sealing lip element 24. Here, the radial length of the fixing bead 23 is chosen so that the fixing bead 23 rests against the holding device 11. The fixing bead 23 likewise serves to prevent the penetration of dust into the interior of the tool fitting device 3. Here, the fixing bead 23 is of shorter design in the radial direction than the first and/or the second dust stripping element 22a, 22b.

At the height or location of the fixing bead 23, the holding device 11 has an annular depression W, into which a free end of the fixing bead 23 is inserted. The annular depression W can also be referred to as a groove. The insertion of the free end of the fixing bead 23 into the annular depression W ensures even better sealing against the penetration of dust into the interior of the tool fitting device 3 since the free end of the fixing bead 23 enters into a form-fitting connection with the holding device 11 in the annular depression W. Moreover, the insertion of the free end of the fixing bead 23 into the annular depression W ensures the firm mounting of the dust protection device 20 on the holding device and simultaneously prevents excessively easy removal of the dust protection device 20 from the holding device 11 (counter to direction F). In order to be able to slide the dust protection device 20 more easily onto the holding device 11 in direction F, the fixing bead 23 has the trapezoidal cross-sectional area with the obliquely rising end face. In order to further improve the mounting of the dust protection device 20 on the holding device 11, the dust protection device 20 is preloaded between the holding device 11 and the tool cap 12 in the radial region Q around the fixing bead. The preload compresses the flexible material of the dust protection device 20 and thus increases the density of the material at this location. In other words: the material of the dust protection device 20 is stiffer in region Q than at the locations outside the region Q.

The sealing lip element 24 is positioned in front of the retention element 14 designed as a snap ring in the axial direction F and is designed substantially with a triangular cross-sectional area. The sealing lip element 24 is thus positioned between the fixing bead 23 and the retention element 17. Here, the retention element 17 designed as a snap ring has a substantially circular cross-sectional area (cf. FIG. 4). The sealing lip element 24 comprises a cross-sectional area that tapers in the radial direction and rests under a preload, by means of the free end, against the surface of the holding device 11 (cf. FIG. 5). By virtue of the specific length D of the sealing lip element 24, the sealing lip element 24 is slightly bent in direction F. As a result, the sealing lip element 24 is shorter in the radial extent (i.e. the length D) than the fixing bead 23 or the dust stripping elements 22a, 22b. Moreover, as shown in FIG. 5, the length D of the sealing lip element 24 is chosen in such a way that a subregion E of the total length D of the sealing lip element 24 is pressed onto the surface of the holding device 11. Here, the subregion E pressed or compressed onto the surface of the holding device 11 is 3/10 (in words: three tenths) of the total length D of the sealing lip element 24. Given a total length D of 10 mm, the subregion E is thus approximately 3 mm long. According to an alternative embodiment, the subregion E may amount to between 1/10 and 5/10 of the total length D of the sealing lip element 24. In contrast to the dust stripping elements 22a, 22b, the sealing lip element 24 acts on the holding device 11.

The position of the sealing lip element 24 and the fixing bead 23 on the dust protection device 20 is chosen so that an annular region F remains free between the sealing lip element 24 and the fixing bead 23. As shown in FIG. 4, the annular region F has a substantially triangular cross-sectional area. The free region F serves to enable the sealing lip element 24 to move in the radial direction without striking the fixing bead 23 as it does so.

Moreover, the sealing lip element 24 may comprise a concave side face directed toward the retention element 17. By virtue of the concave side face, the sealing lip element 24 can rest against the outer wall of the snap ring 17 over a large area when the sealing lip element 24 is set in motion by vibration. By virtue of the large-area contact between the concave side face of the sealing lip element 24 and the outer wall of the snap ring 17, the snap ring 17 is optimally sealed off from dust penetrating into the tool fitting device 3.

At the rear end 20*b*, the dust protection device 20 has an overlap 25. The overlap 25 may also be referred to as a finger. As shown in FIG. 4, the overlap 25 extends in the axial direction F and is positioned between the surface of the holding ring 16 and an overlap 25 of the tool cap 12. By virtue of the overlap 25 of the dust protection device 20 and the overlap of the tool cap 12 and by virtue of the positioning of the fixing bead 23 in the annular depression W on the holding device 11, the dust protection device 20 is connected relatively firmly to the other components (especially the holding device and the tool cap) of the tool fitting device 3 and secured against accidentally falling off the tool fitting device 3.

LIST OF REFERENCE SIGNS

1 Power tool
2 Housing
2*a* Front end of the housing
2*b* Rear end of the housing
3 Tool fitting device
4 Drive
5 Impact mechanism
7 Tool
7*a* Rear end of the tool; tool shank
8 Handle
9 Activation switch
10 Mains cable connection
11 Holding device
12 Tool cap
13*a* Locking pawl
13*b* Locking pawl
14 Release device
15 Damping element
16 Holding ring
16*a* Sector-shaped recess on the holding ring
17 Retention element
18 Openings in holding device
19 Spring
20 Dust protection device
20*a* Front end of the dust protection device
20*b* Rear end of the dust protection device
21 Central through hole in the dust protection device
22*a* First dust stripping element
22*b* Second dust stripping element
23 Fixing bead
24 Sealing lip element
25 Overlap
A Distance between first and second dust stripping element
B between end of the second dust stripping element and end of the holding device
C Distance between inner lateral surface of the dust detection device and surface of the holding device
D Length of the sealing lip element
E Subregion of the total length of the sealing lip element
F Axial direction
G Radial direction
H Radial direction
L Length of the first and second dust stripping element
N Axial longitudinal axis
Q Flexible region of the dust protection device
V Depression on holding device for retention element
W Depression on holding device for fixing bead

What is claimed is:

1. A tool fitting device for a power tool, the tool fitting device comprising:
   a holder for receiving and holding a tool shank;
   a retainer extending at least around a section or sections of the holder; and
   a dust protector for preventing the penetration of dust into the tool fitting device, the dust protector including at least one first dust stripper, at least one fixing bead having a radial length configured to extend radially into the holder, and at least one sealing lip, the sealing lip being positioned in front of the retainer in the axial direction, the sealing lip bearing against a surface of the holder, wherein the sealing lip is configured with respect to the fixing bead so as to define a free space between the fixing bead and the sealing lip along the outer surface of the holder, the holder not extending into the free space.

2. The tool fitting device as recited in claim 1 further comprising a second dust stripper, the first and the second dust strippers being arranged at a distance from one another along an axial longitudinal axis.

3. The tool fitting device as recited in claim 1 wherein the dust protector and the holder are arranged relative to one another in such a way that a distance along an axial longitudinal axis is provided between one end of the at least one dust stripper and one end of the holder.

4. The tool fitting device as recited in claim 1 wherein the sealing lip includes a cross-sectional area tapering in the radial direction.

5. The tool fitting device as recited in claim 1 wherein the sealing lip includes a concave side face directed toward the retainer.

6. The tool fitting device as recited in claim 1 wherein the fixing bead has a trapezoidal cross-sectional area.

7. A method for a tool fitting device as recited in claim 1 comprising fitting the dust protector onto the holder.

8. A chipping hammer comprising the tool fitting device as recited in claim 1.

9. The tool fitting device as recited in claim 1 wherein a subregion of the sealing lip pressed onto the surface of the holder is between $1/10$ and $5/10$ of a total length of the sealing lip in the axial direction.

10. The tool fitting device as recited in claim 9 wherein the total length of the sealing lip in the axial direction is 10 mm.

11. The tool fitting device as recited in claim 1 wherein a subregion of the sealing lip pressed onto the surface of the holder is $3/10$ of a total length of the sealing lip in the axial direction.

12. The tool fitting device as recited in claim 11 wherein the total length of the sealing lip in the axial direction is 10 mm.

13. The tool fitting device as recited in claim 1 wherein the retainer is a snap ring.

14. The tool fitting device as recited in claim 13 wherein the snap ring rests in a groove on the holder.

15. The tool fitting device as recited in claim 1 wherein the fixing bead has a free end inserted in an annular groove of the holder.

16. The tool fitting device as recited in claim 15 wherein the fixing bead has a trapezoidal cross section with an obliquely rising end face facing toward the sealing lip.

* * * * *